United States Patent
Zucchetti

(10) Patent No.: US 7,020,640 B2
(45) Date of Patent: Mar. 28, 2006

(54) METHOD FOR CERTIFYING DATA CONTAINING A SEQUENCE OF TRANSACTIONS

(75) Inventor: Domenico Zucchetti, Lugano (CH)

(73) Assignee: Banana.ch S.A., Lugano (CH)

( * ) Notice: Subject to any disclaimer, the term of this patent is extended or adjusted under 35 U.S.C. 154(b) by 250 days.

(21) Appl. No.: 10/101,954

(22) Filed: Mar. 21, 2002

(65) Prior Publication Data

US 2003/0182244 A1 Sep. 25, 2003

(51) Int. Cl.
*G06F 17/00* (2006.01)

(52) U.S. Cl. .............................. 705/75; 705/62; 705/76; 713/156

(58) Field of Classification Search ................ 713/157, 713/152, 158, 162, 156; 380/286; 705/75, 705/62, 76

See application file for complete search history.

(56) References Cited

U.S. PATENT DOCUMENTS 5,745,574 A * 4/1998 Muftic ........................ 380/23

FOREIGN PATENT DOCUMENTS

JP 411055251 A * 2/1999

OTHER PUBLICATIONS

IBM Technical Disclosure Bulletin, Title: Distributed optimistic concurrency control based on time-stamp history certification, TDB-ACC-NO: NN9104178, vol. 33, Apr. 1991.*

* cited by examiner

*Primary Examiner*—Elisca Pierre Eddy
(74) *Attorney, Agent, or Firm*—Sughrue Mion, PLLC

(57) ABSTRACT

It is described a method for certifying data containing a sequence of transactions comprising the following steps:
  finding a new transaction added to the sequence;
  computing a certification code for the new transaction taking into consideration all data preceding the transaction in the preserved order;
  saving the computed certification codes.

In particular, each transaction will carry a certification code and a sequence number that uniquely identify all the data received up to the transaction. By saving the progressive transaction count and the relative certification code it become possible, at a later time, to verify the integrity of the whole data.

The described certification method allows the use of electronic certification in the accounting world.

41 Claims, 3 Drawing Sheets

METHOD FOR CERTIFYING DATA CONTAINING A SEQUENCE OF TRANSACTIONS

TECHNICAL FIELD

This invention relates to a method for certifying data containing a sequence of transactions.

The invention particularly, but not exclusively, concerns the certification of accounting data, and the description hereinbelow will cover this field of application for convenience of illustration.

BACKGROUND OF THE INVENTION

As is known, electronic documents are increasingly becoming part of business practice, thus urging the need of finding a simple and sure certification technique for this kind of documents. Many countries already consider an electronic signature to be legally binding, indeed.

The process of signing an electronic document is, however, totally different from that used for paper-based documents. In particular, an electronic signature has to observe the following rules:

It guarantees that the document content has not been altered after the document has been approved and thus signed (the so-called "evidence of integrity").

It should provide for the identity verifying of the signer (the so-called "evidence of identity") as well as the signature validity (the so-called "evidence of the intent to authenticate").

A known authentication technique usually indicated as content certification is performed by computers that process the entire content of an electronic document and compute a certification code that uniquely identifies such a document. In this way, if any part of the document has been modified (in particular, if data has been displaced, changed, deleted, inserted), a new certification code will be generated using such techniques. Actually, in order to check that a document has not been changed, a certification code is computed, compared to the original one and appropriately stored. Then the document is authenticated only if the new computed code corresponds to the previous one, thus proving that the document has the original content. By using this technique it will always be possible to check the integrity of a document.

Known certification techniques of this type can be applied to any kind of document (text, images, music, video) of any size. A single certification code can also be computed to include different documents. The use of such a certification code corresponding to a computer-generated number is really efficient, only a small sized data being stored or sent to ensure the document validity, and really secure, since using a well known and used 128 bit-code there is only one chance in thousands of billions that different documents turn out to have the same code.

This is way code-based certification is the basis of digital signature technology and all modern certification and security systems.

It is also known to provide electronic documents with a digital signature certificate, which is a computed "code" based on personal identity certificate (digital ID) and the content of the document. The digital signature is therefore unique both to the individual and to the document, different codes corresponding to different document and person.

In order to sign a document, personal identification is required. A personal identity certificate (digital ID) is usually a data sequence including two parts and is unique to a person. The personal certificate has both a private and a public part. The private part is used to compute a signature and should therefore be kept secret (usually it is stored in a chip card). The public part of the digital ID is used to check and validate the signature and thus made freely available.

Also known are other identification means e.g., PIN, access codes, or on biometric data (fingerprints, retinal scans).

Moreover, to prove that a document has not been altered, it is necessary to keep also its certification code in a form that can bring evidence to bear that the code is the original one. The certification code and the date of first calculation should therefore be authenticated in an appropriate way.

An easier way to "preserve" the code and the corresponding date would consist in printing the code on paper and then having it signed by an auditor or by a company representative.

Newly approved laws in many countries require the evidence of data integrity and a demonstrable specific sequence of data also in accounting applications.

It should be noted that keeping accounting registrations is mandatory for a large number of entities. Since accounting data are also the basis for tax collection, income calculation and determines the binding credit/debit positions of a company or individuals, the accounting as a whole is a legally binding instrument. All countries have legislation that prescribes exactly how accounts should be kept, each specific tax rule influencing how transactions should be calculated and recorded as well.

In particular, the fundamental accounting rules are the following:

accounting data should give correct and true evidence of all transactions and of the financial situation (the so-called "principle of understandability, relevance, reliability, comparability, consistency" as indicated by the International Accounting Standard (IAS) and US Generally Accepted Accounting Principles (GAAP)).

accounting data should be kept in a timely manner.

accounting data should be organized according to the size and needs of the company.

accounting data are legal documents, that should not be modified, but on the contrary preserved over time.

management is directly responsible for the accounting system.

In order to comply with these rules, every transaction that influences the financial position of a company must be recorded and for every transaction there must be a document that supports the operation (invoice, receipt).

Moreover, transactions must be recorded according to generally accepted accounting standards and fiscal accounting rules and if a transaction is not correct it should be rectified.

Finally, accounting data should be kept on a regular basis and made available in a timely manner according to the applying country law.

In other words, accounting consists of a precise recording of transactions and the quality of the accounting work is checked by controlling that the transactions have been entered and conform to the documents.

In small organizations, few people are responsible for accounting. It is easy to verify that the work has been properly organized and whether all documents have been taken into consideration. It is simple to compare documents with the recorded transactions.

In large organizations with a large number of transactions, it is very hard or not possible to control all the records and all the documents. In large entities there are many individuals who supply information. This work must be properly coordinated, secured and checked.

Small companies will have a simple organization whereas large companies will have a structured and complex organization.

In certain cases, depending on legislation within the country and the legal form of the entity, the accounting also needs to be audited and certified.

Computers have made it much easier to record transactions. However, different problems also arise:

Electronic content is not bound to a support.

Electronic data can be changed.

Electronic data can be copied and replicated, the copies being totally similar to the original.

Data filed on electronic media cannot be directly read by human beings, a technical process being necessary in order to access and view the information.

Actually used in the accounting field is a passive security of the accounting data (password protection).

However, such a security technique is a defense systems that only allows authorized users to have access to the accounting data, to be enabled to enter data and make changes. Such a security can be bypassed intentionally or unintentionally. An incorrect program could wrongly modify the data. Moreover, the passive security:

requires that data remains in a protected environment.

requires a clear distinction between the users who oversee security and users who use the data;

requires a system to ensure that accounting data are only entered by authorized users.

In effect, the passive security of the accounting data is an important organization measure that ensures the accounting data quality and security. However, this kind of passive security cannot offer full evidence of the integrity of the information contained in the accounting data.

The change from a paper-based accounting system to a computer-based accounting system requires that the security and legal validity of accounting data should be reconsidered.

The integrity of an electronic document is a fundamental requirement for the validity of a digital signature. If a document is changed the authenticity of the document is lost and the digital signature is no longer valid. A certification technique is the central criteria through which the law considers an electronic document to be valid.

To summarize, electronic documents and passive security cannot offer evidence of integrity on their own. Only by using certification and signature techniques is it possible to give full evidence of the integrity of the data.

However, the traditional certification techniques compute a certification of a file (document or document and a personal identity certificate) as a whole. They are thus not suitable for certifying changing and growing data, as in the case of accounting database. In particular, it should be emphasized that when new transactions are added into a database, the already computed certification code according to the known techniques becomes obsolete.

So, traditional certification techniques could only be used with data sets that are final and that will not change and cannot be used in the accounting field where the data and database are "in progress". In such a field, the new transactions are being added continuously to an accounting database and certification of the accounting file could not be made until the accounting year is closed and the corresponding accounting data made final.

Moreover, it should be noted that accounting databases do not assure that transactions are kept in a specific order. In particular, a query applied to such a database could return data in different orders. In the specific field of accounting data, however, the order in with transactions occur could be really important.

SUMMARY OF THE INVENTION

An embodiment of this invention provides a new and simple certification method that permits certification of not-static data, like accounting data or database. In particular, the method provides that a certification code is computed for each transaction taking into consideration all data preceding the transaction in the preserved order, so that all transactions receive a certification code that considers all data up to the actual transaction.

The certification method comprises the following steps:
finding a new transaction added to the sequence;
computing a certification code for the new transaction taking into consideration all data preceding the transaction in the preserved order;
saving the computed certification codes.

The features and advantages of a certification method according to the invention will be apparent from the following description of an embodiment thereof, given by way of non-limitative example with reference to the accompanying drawings.

DETAILED DESCRIPTION

Figure 1:
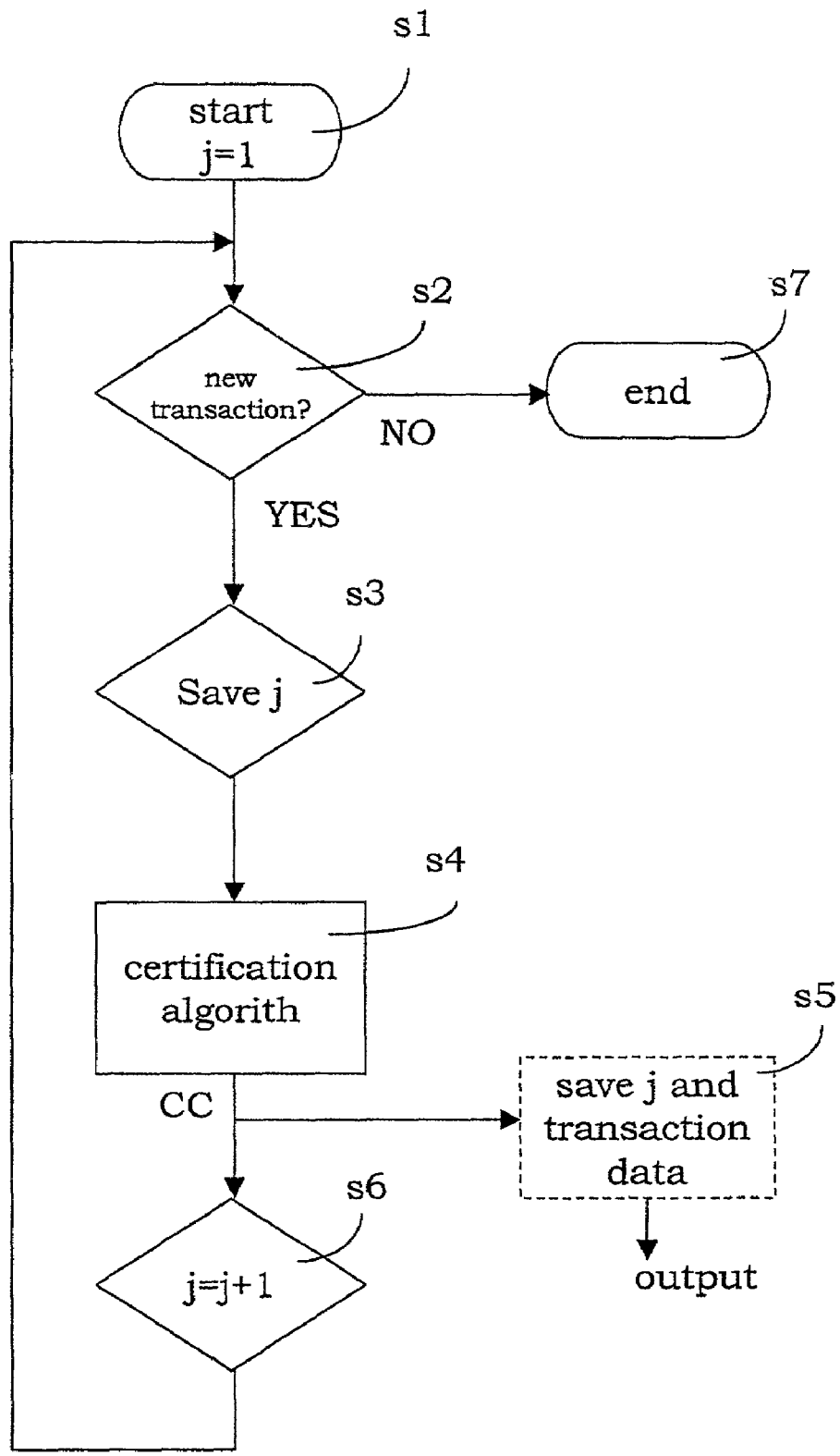
FIG. 1 is a flow chart of the steps sequence according to a first embodiment of the certification method of the invention.

It should be firstly noted that the known passive security system, as used in accounting systems, does not bring to bear total evidence of the integrity and authenticity of the content of the accounting data and database. Also a software failure may change the information and the passive security system will not detect such changes. Therefore passive security systems are not considered to be a valid technique to authenticate and sign electronic content of the accounting data by law.

However, the integrity of accounting data is fundamental to the validity of an accounting system and the law requires that the integrity of electronic content is ensured through a certification technique. So, from a legal point of view a new approach to accounting data security is needed.

The method according to the embodiments of the invention allows certification by codes on an evolving database, the added item being identifiable as new transactions. In particular, the certification method comprises two main steps:

The data set receives a final, unique and identifiable data order, all transactions being numbered progressively.

Each transaction is certified progressively.

According to an embodiment of the invention, a certification code is computed for each transaction taking into consideration all data preceding the transaction in the preserved order.

In such a way, all transactions receive a certification code that considers all data received up to the actual transaction.

In other words, a new file certification code is computed as the transaction sequence evolves, in term of number or content of such a sequence.

In particular, if a transaction changes, then all certification codes from and following that transaction will change. However, if there are 100 transactions, for example, only the certification code of the 101st. transaction needs to be annotated and where an already stored transaction is changed, displaced or deleted then the certification code of the 102nd transaction will be different.

Advantageously according to this embodiment of the invention, in order to check if any transaction has changed it is only necessary to compare and check the certification code of the last transaction.

When new transactions are added new certification codes for all the new transactions will be created while the already computed transactions' certification codes will not change.

In particular, the accounting data are processed as follows:

The new transactions are numbered.

In particular, each transaction line receives a progressive number starting from one. This progressive number is unique (no duplicate allowed) and independent from the document number. The progressive number is saved within the transaction record and becomes part of the accounting data.

The new transactions receive a data certification code.

A certification code is created based on the transaction data. If the transaction is changed then the code will be different. The code is saved within the transaction record and becomes part of the accounting data.

All the transactions receive a cumulative certification code.

This code is computed including a progressive number and all the preceding transaction data. Each transaction line will therefore have a code that identifies all transaction data up to this point. The code is saved within the transaction record and becomes part of the accounting data.

All certification codes can be checked.

The certification codes are stored with the other accounting data. All codes can be recalculated and checked at any time, in order to verify that the stored codes correspond to the calculated ones. Any attempt to bypass the lock and change the transaction data will therefore be useless.

In particular, since the certification method according to the invention marks each record with a progressive sequence number, it is possible to check or recreate all certification codes following such a sequence number.

In case of a regular working of the accounting system, the certification code generated by a new computation should be the same to the one stored within the accounting data or to the one saved aside.

On the contrary, if the newly computed certification code differs than the one stored in the accounting data, a data modification has occurred.

Advantageously according to the certification method of the invention, such failure cases are simply detected and the company's organization could take the appropriate steps in order to verify the all system.

In such a case, it may be necessary to retrieve a backup copy of the data or to check the transactions.

It should be noted that it is not possible to foresee how many transactions will be added for instance in predetermined period of time and the database will be in a finalized state only at the end of that period of time. Advantageously according to the embodiments of the invention, to certify for instance all accounting data received up to one month it will only be necessary to set aside the certification code CC for the last transaction of the month.

In order to verify the integrity of the transactions, it will be sufficient to go to a specific transaction number and check that the certification code CC is still the same.

The certification method thus causes a change by marking the data with new information. The effect is of physical nature. After applying this method the data ensemble residing is modified so that it is at any time possible to recover the data sequence (progressive number) and the certification number.

By marking the data in a specific sequence it is possible to recalculate and check exactly that the sequence has not been changed, data has been deleted or added.

Referring to the drawing figures, FIG. 1 is a flow chart illustrating the certification method according to a first embodiment of the invention.

In particular, the certification method comprises the following steps:

s1) Starting the certification method and initializing a counter (j) corresponding to a sequence number to an initial value (for instance, j=1)

s2) Finding a new transaction
   if (not)
s7) ending sequence s3) Saving the sequence number j within a record.

s4) Using the transaction data to feed a progressive certification algorithm.

In particular, a certification code CC is calculated using an algorithm that create a data signature. In such a way, the transaction data will be uniquely identified.

The signature algorithm can be chosen based on security, performance or other requirement.

It should be noted that all transaction data are used to calculate the certification code CC, including its progressive number.

s5) Eventually saving the certification code CC with the transactions data.

Advantageously according to this embodiment of the invention, the computed certification code CC can be displayed, saved and printed separately from the data.

s6) Incrementing the counter j and repeating from step s2.

According to this embodiment of the certification method of the invention, the accounting data are certified as a whole. It is also possible to certify in this way all new added transactions.

Figure 2:
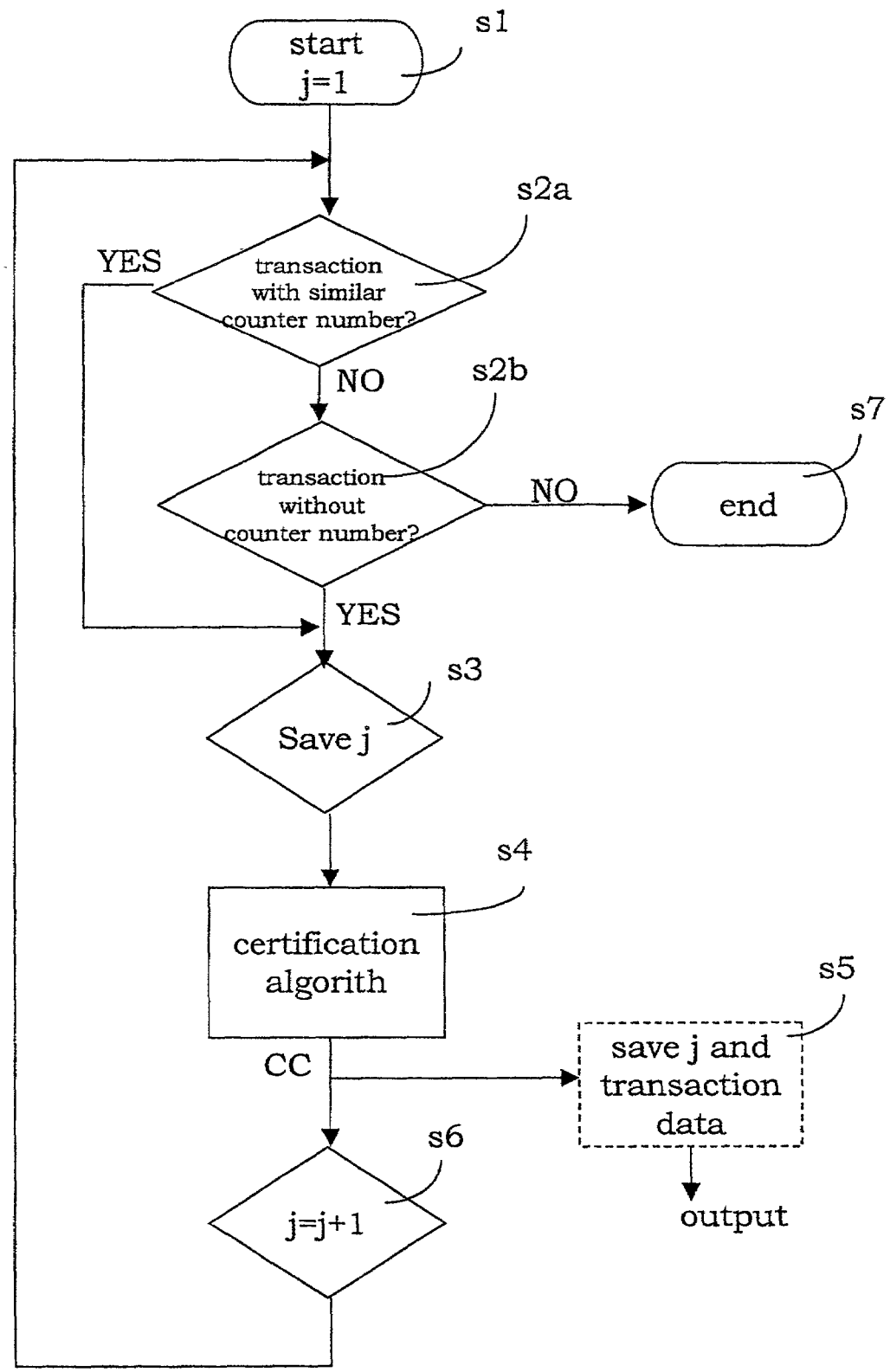
FIG. 2 is a flow chart of the steps sequence according to a second embodiment of the certification method of the invention.

In particular, according to a second embodiment of the invention, the certification method check if there are transactions that have already been numbered and, when there are no more numbered transactions, it continues with the new transactions. According to this embodiment, as illustrated in FIG. 2, the certification method also comprises, after the above described step s1 (start and initialize a counter), the following steps:

s2a) Finding a transaction with a similar sequence number.
  if not found
s2b) Finding a record/transaction without a sequence number
    If not found
      s7) ending sequence
    if found
s3) Saving the sequence number j within a record.

In a third embodiment of the invention, the calculation of the certification code is made separately with each transaction. In particular, to calculate a new transaction certification code the previous certification code is used in combination with the transaction data.

It should be noted that this processing sequence is faster since it is possible to restart the certification algorithm from the last certified data.

Figure 3:
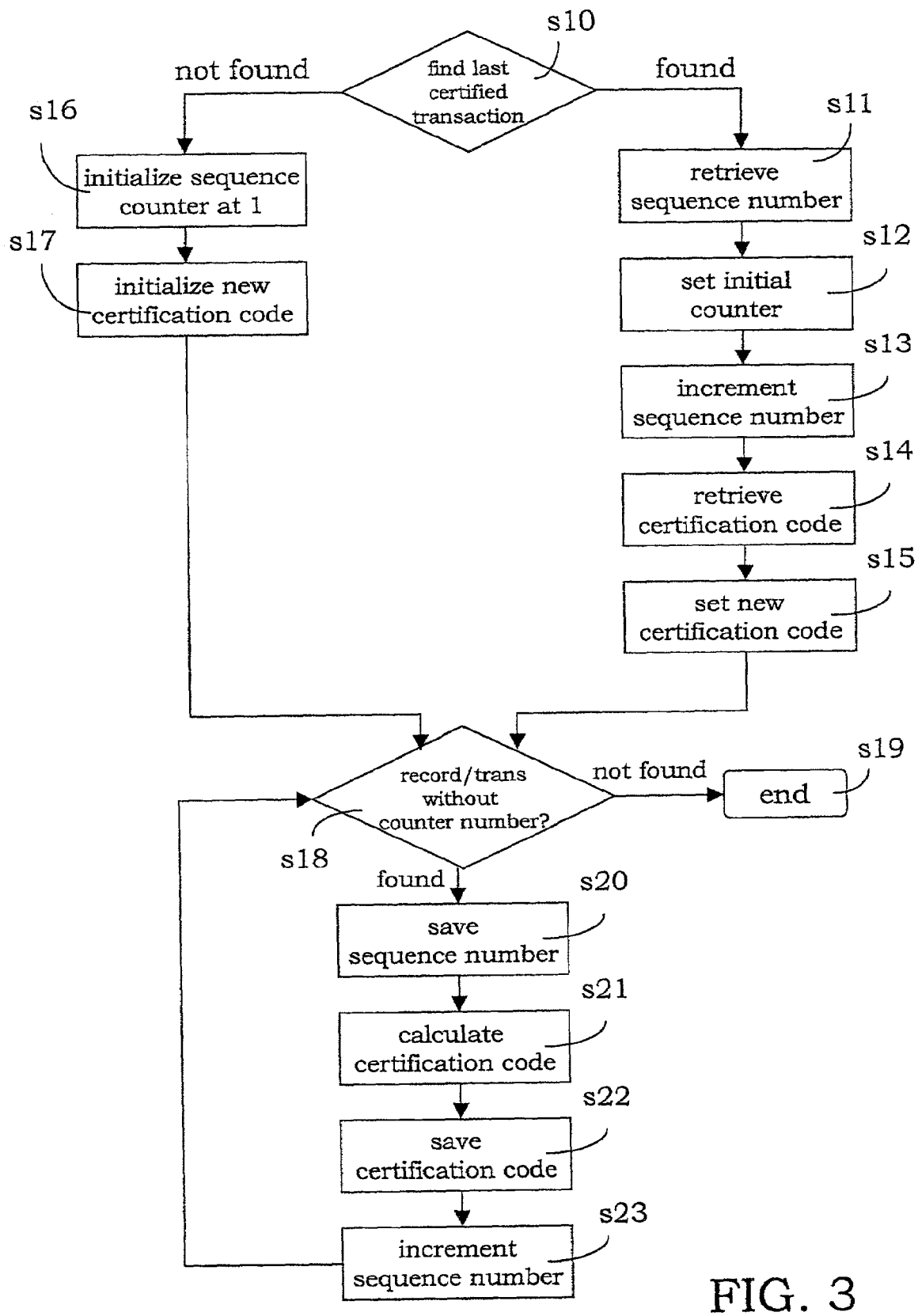
FIG. 3 is a flow chart of the steps sequence according to a third embodiment of the certification method of the invention.

According to this embodiment, as illustrated in FIG. 3, the certification method comprises the following steps:

s10) Finding the last certified transaction (corresponding to the highest sequence number j)
if found
   s11) Retrieving the sequence number of the transaction.
   s12) Setting the initialize counter with the retrieved sequence number.
   s13) Incrementing the sequence number.
   s14) Retrieving the certification code of the transaction.
   s15) Setting the new certification code with the retrieved transaction's code.
if not found
   s16) Initializing the sequence counter with the initial value j=1).
   s17) Initializing the last certification code with null or any other initial code.
s18) Checking if there is a record/transaction without a counter number
If not found
   s19) ending sequence.
s20) Saving the sequence number within a record.
s21) Calculating the certification code using the last (previous) certification code and the transaction data (inclusive progressive number).
s22) Saving the certification number with the transactions data.
s23) Incrementing the counter (sequence number).
s24) Repeating from step s18.

If the data contained in the record is not fixed but it is included in different segments or fields that data can appear in different ordering list it is necessary to order the segments or fields and retrieve the data always in the same order before the data is certified.

Advantageously according to this embodiment of the invention, by using the certification code of the last record to calculate the certification code of the successive record, it is possible to check or recreate all certification codes in real time.

In particular, every time a new transaction is added, the sequence number is incremented and the new certification code is created including the last computed certification code, by following the steps of:
   retrieving the last sequence number;
   retrieving the last computed certification code;
   saving the transaction data with the sequence number; and
   calculating the new certification code using the last computed certification code and the transaction data (including the sequence number).

A fourth embodiment of the invention provides for the following steps to be made before the start of the certification method as described above:
   Determining all possible fields
   Sorting the field by a specific order (for example alphabetically) and saving the order in which the fields should be used.

Then, according to this embodiment, for each record the field sequence that has been determined will be used to retrieve or assemble the data for the specific record and compute the certification code.

There are also cases where the record data include one or more essential field, where specific numeric information (quantitative of qualitative), that is essential to the data information (amount of a transaction, quantity for a stock purchase, time for a hour calculation for example) are stored.

A fifth embodiment of the certification method of the invention provides for adding a new field where the above indicated specific value(s) is computed (accumulated or using any appropriate mathematical operation). Such new field will therefore include a sum of all preceding values. The sum become part of the data record and is included in the computation of the signature key.

There may be different such fields and different method of computation of such total fields. A field total may include, for example, the value of multiple record values (for examples increase and decrease/debit or credit).

This fifth embodiment of the invention provides for the following sequence of steps:
   Saving the last total
   Computing the new value(s)
   Saving the value in the record Moreover, according to this embodiment, when the sum exceeds the field length, the information to be stored is limited in size according to the following sequence of steps:
   Before computing a new total it will be checked that the last total or the new computed total do not exceed a predefined limit.
   If the limit is reached the count/total value is set to a new value (reset, truncated or whatever operation is appropriate for the case).

Finally, according to a sixth embodiment of the certification method of the invention, the certification steps are applied only to transaction/record that have specific requirement, according to the following alternative conditions:
   checking the validity of the transaction/record, or
   checking that certain parameters are satisfied (for example, the transaction date is prior to a specific date).

According to the first condition, the certification method is made totally dependent on specific requirement.

In such a case, in fact, all transactions are firstly checked for validity and if at least one transaction is found to be not valid, then the certification method does not begin.

According to the second condition, the certification method applies only to transactions that fulfill desired requirements. A transaction is numbered and certified only if satisfy the checked parameters.

In such a case, the certification method continue up to a transaction that is found not complying and then will stop.

To summarize, a certification method according to the embodiments of the invention shown and discussed herein above has the following advantages:

1. It allows the use of certification in the accounting world. Data integrity can be ensured in any environment even when accounting data is modified and transferred on unsecured computers. Accounting data can be certified, signed and legally recognized just like any other electronic document. This level of security and data integrity should surpass most current legal specifications. The accounting results should therefore be accepted in most countries of the world.

2. The certification of the accounting data can be made by simply following the saved sequence number and computing the certification code again in order to check that the saved certification code corresponds to the new computed one. So, by externally saving the certification code of a specific numbered transaction it is possible to verify that the new computed certification code is the same and therefore that the data has not been changed.

3. Each transaction will carry a certification code and a sequence number that uniquely identify all the data received up to the transaction. By saving the progressive transaction count and the relative certification code it become possible, at a later time, to verify the integrity of the whole data.

4. It permits the detection of any changes, even those caused by software or technical failure. In particular, data certification ensures data integrity even when data is restored or sent to another computer. In this way, the certification method can be used to better organize accounting departments and keep the whole accounting system totally secure.

5. It can be an integral part of an accounting software, so that the integrity of the accounting data should be easily preserved and demonstrated. Moreover, the data security technique using certification codes allows certification of live databases, with a full series of measures that will make accounting software secure and prepared for any new and future legal requirements.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for certifying data containing a sequence of transactions comprising the following steps:
    finding a new transaction added to the sequence;
    electronically computing a certification code for the new transaction taking into consideration all data preceding the transaction in the preserved order using a certification code computed for a previous transaction in combination with the transaction data;
    saving the computed certification codes;
    finding a last certified transaction corresponding to the highest sequence number;
    if the last certified transaction is found:
        retrieving the sequence number of the last certified transaction;
        setting a counter with the retrieved sequence number of the last certified transaction;
        incrementing the sequence number;
        retrieving the certification code of the last certified transaction;
        setting a new certification code with the retrieved code certification code of the last certified transaction;
    if the last certified transaction is not found:
        initializing the sequence number with an initial number;
        initializing the last certification code with an initial code;
        checking if there is a transaction without a counter number;
        stopping the method if a transaction without a counter number is not found;
        saving the sequence number within a record;
        computing the certification code using the last certification code and the transaction data;
        saving the certification number with the transaction data;
        incrementing the sequence number;
        repeating from the step of checking if there is a transaction without a counter number.

2. The method according to claim 1 further comprising the following steps:
    starting the sequence of steps and initializing a sequence number for the transactions to an initial value;
    finding a new transaction;
    if a new transaction is not found:
    stopping the method;
    otherwise, if a new transaction is found:
        saving the sequence number within a record comprising the transaction data;
        using the transaction data to feed a progressive certification algorithm to compute the certification code;
        incrementing the sequence number and repeating the steps from the step of finding a new transaction.

3. The method according to claim 2 further comprising the following step:
    saving the certification code with the transaction data.

4. The method according to claim 2 wherein said certification algorithm creates a data signature.

5. The method according to claim 2 wherein said certification algorithm uses all transaction data to calculate the certification code.

6. The method according to claim 2 further comprising, before the starting step of the steps sequence and the initializing phase of said sequence number to an initial value, the following steps:
    finding a transaction with a similar sequence number;
    if a transaction with a similar sequence number is not found:
    finding a transaction without a sequence number;
    if a transaction without a sequence number is not found:
        stopping the method;
    otherwise, if a transaction without a sequence number is found:
        saving the sequence number within the record.

7. The method according to claim 1, wherein said transaction data used to compute the certification code comprises the sequence number.

8. The method according to claim 1 wherein the data are contained in a plurality of fields and further comprising, before the step of finding a new transaction added to the sequence, the following steps:
    determining all possible fields containing data;
    sorting the fields by a specific order and saving the order in which the fields should be used;
    for each record the field sequence that has been determined will be used to retrieve the data for the specific record and compute the certification code.

9. The method according to claim 1 wherein the data include at least an essential value and further comprising the following step:
    adding a new field where the essential value is stored, the new field being included in the computation of the certification code.

10. The method according to claim 9 wherein the essential value is calculated starting from the transaction data.

11. The method according to claim 10 wherein the essential value includes a sum of all preceding essential values.

12. The method according to claim 11 further comprising the following steps:
    saving the last sum of the essential value;
    computing the new essential values;
    saving the last essential value in the record.

13. The method according to claim 12 wherein the last essential value is limited in size according to the following sequence of steps:
    before computing a new sum, checking that the last sum or the new computed sum do not exceed a predefined limit;

setting the last essential value to a new value if the predefined limit is reached.

14. The method according to claim 13 wherein the new value is a truncated value of the last essential value.

15. The method according to claim 1 further comprising an initial step of checking specific requirement to be fulfilled by new transactions.

16. The method according to claim 15 wherein said initial step comprises a check of the validity of the new transactions.

17. The method according to claim 15 wherein said initial step comprises a check that certain parameters of the new transactions are satisfied.

18. The method according to claim 1 further comprising a phase of checking the stored data including the following steps:
    recreating all certification codes starting from the sequence number;
    comparing the newly computed certification codes with the stored certification codes;
    showing a correct working condition if the newly computed certification codes coincide with the stored certification codes
    showing a failure condition if the newly computed certification codes differ from the stored certification codes.

19. The method according to claim 18 further comprising the step of retrieving a backup copy of the data if a failure condition is shown.

20. The method according to claim 18 further comprising the step of checking all data if a failure condition is shown.

21. A method for certifying data containing a sequence of records and transactions comprising the following steps;
    new transactions are numbered progressively, the sequence number being unique and saved within the transaction record;
    new transactions receive a data certification code based on the transaction data and saved within the transaction record;
    all the transactions receive a cumulative certification code, computed including the sequence number and all the preceding transaction data and saved within the transaction record;
    all certification codes are recalculated and checked at any time, in order to verify that the stored codes correspond to the new calculated ones.

22. The method according to claim 21 wherein the certification code is obtained by a progressive certification algorithm to compute the certification code starting from the sequence number and the transaction data.

23. The method according to claim 22 wherein the certification algorithm creates a data signature.

24. The method according to claim 21 further comprising, before the step of progressively numbering the new transaction, the following steps:
    finding a transaction with a similar sequence number;
    find a transaction without a sequence number if a transaction with a similar sequence number is not found:
    stopping the method if a transaction without a sequence number is not found
        saving the sequence number within the record if a transaction without a sequence
    number is found.

25. The method according to claim 21 wherein the step of computing the certification code of a new transaction uses a certification code computed for a previous transaction in combination with the transaction data.

26. The method according to claim 21 further comprises the following steps:
    finding a last certified transaction corresponding to the highest sequence number;
    if the last certified transaction is found:
        retrieving the sequence number of the last certified transaction;
        setting a counter with the retrieved sequence number of the last certified transaction;
        incrementing the sequence number;
        retrieving the certification code of the last certified transaction;
        setting a new certification code with the retrieved code certification code of the last certified transaction;
    if the last certified transaction is not found:
        initializing the sequence number with an initial number;
        initializing the last certification code with an initial code;
        checking if there is a transaction without a counter number;
        stopping the method if a transaction without a counter number is not found;
        saving the sequence number within a record;
        computing the certification code using the last certification code and the transaction data;
        saving the certification number with the transactions data;
        incrementing the sequence number;
        repeating from the step of checking if there is a transaction without a counter number.

27. The method according to claim 26 wherein said transaction data used to compute the certification code comprises the sequence number.

28. The method according to claim 21 wherein the data are contained in a plurality of fields and further comprising, before the step of progressively numbering the new transaction, the following steps:
    determining all possible fields containing data;
    sorting the fields by a specific order and saving the order in which the fields should be used;
    for each record, using the field sequence that has been determined to retrieve the data for the specific record and compute the certification code.

29. The method according to claim 21 wherein the data include at least an essential value and further comprising the following step:
    adding a new field where the essential value is stored, the new field being included in the computation of the certification code.

30. The method according to claim 29 wherein the essential value is calculated starting from the transaction data.

31. The method according to claim 30 wherein the essential value includes a sum of all preceding essential values.

32. The method according to claim 31 wherein the last essential value is limited in size according to the following sequence of steps:
    before computing a new sum it will be checked that the last sum or the new computed sum do not exceed a predefined limit;
    setting the last essential value to a new value if the limit is reached.

33. The method according to claim 32 wherein the new value is a truncated value of the last essential value.

34. The method according to claim 30 further comprising the following steps:
    saving the last sum of the essential value;
    computing the new essential values;
    saving the last essential value in the record.

35. The method according to claim 21 further comprising an initial step of checking specific requirement to be fulfilled by new transactions.

36. The method according to claim 35 wherein said initial step comprises a check of the validity of the new transactions.

37. The method according to claim 35 wherein said initial step comprises a check that certain parameters of the new transactions are satisfied.

38. The method according to claim 21, wherein the certification code for the last transaction of a month is set apart.

39. The method according to claim 21 further comprising a phase of checking the stored data including the following steps:
- recreating all certification codes starting from the sequence number;
- comparing the newly computed certification codes with the stored one;
- showing a correct working condition if the newly computed certification codes coincide with the stored certification codes
- showing a failure condition if the newly computed certification codes differ from the stored certification codes.

40. The method according to claim 39 further comprising the step of retrieving a backup copy of the data if a failure condition is shown.

41. The method according to claim 39 further comprising the step of checking all data if a failure condition is shown.

* * * * *